(12) United States Patent
Hawkins

(10) Patent No.: US 9,267,631 B2
(45) Date of Patent: Feb. 23, 2016

(54) CONNECTOR

(76) Inventor: David Frederick Hawkins, Hayes (GB)

( * ) Notice: Subject to any disclaimer, the term of this patent is extended or adjusted under 35 U.S.C. 154(b) by 26 days.

(21) Appl. No.: 14/111,316

(22) PCT Filed: Apr. 5, 2012

(86) PCT No.: PCT/EP2012/056288
§ 371 (c)(1),
(2), (4) Date: Jan. 20, 2014

(87) PCT Pub. No.: WO2012/139969
PCT Pub. Date: Oct. 18, 2012

(65) Prior Publication Data
US 2014/0131995 A1     May 15, 2014

Related U.S. Application Data

(60) Provisional application No. 61/474,237, filed on Apr. 11, 2011.

(30) Foreign Application Priority Data

Apr. 11, 2011  (GB) .................................. 1106113.2

(51) Int. Cl.
*F16L 35/00* (2006.01)
*F16L 37/08* (2006.01)
*F16L 37/091* (2006.01)

(52) U.S. Cl.
CPC ................ *F16L 37/08* (2013.01); *F16L 37/091* (2013.01); *F16L 2201/10* (2013.01)

(58) Field of Classification Search
USPC .................................................... 285/93, 340
See application file for complete search history.

(56) References Cited

U.S. PATENT DOCUMENTS

| | | | |
|---|---|---|---|
| 2,786,696 A | | 3/1957 | Feldmeier |
| 3,650,549 A | * | 3/1972 | Pepper ............................ 285/27 |
| 4,655,078 A | * | 4/1987 | Johnson ........................... 73/168 |
| 5,383,338 A | * | 1/1995 | Bowsky et al. .................. 62/125 |
| 7,083,393 B2 | * | 8/2006 | Myers et al. ..................... 417/63 |
| 2006/0151995 A1 | | 7/2006 | Saarem et al. |
| 2007/0145743 A1 | | 6/2007 | Greenberger et al. |

FOREIGN PATENT DOCUMENTS

| DE | 202007010938 U | 10/2007 |
|---|---|---|
| EP | 1004805 A2 | 7/2000 |
| WO | WO2011/012899 A3 | 3/2011 |

OTHER PUBLICATIONS

Written Opinion of the International Searching Authority for International Application No. PCT/EP2012/056288.

* cited by examiner

*Primary Examiner* — Aaron Dunwoody
(74) *Attorney, Agent, or Firm* — Heslin Rothenberg Farley & Mesiti P.C.; Kristian E. Ziegler

(57) ABSTRACT

The disclosure provides a connector for connecting to an end of a tube. The connector may include a hollow connector body having an opening for receiving the end of the tube. The connector may further include a gripping mechanism for gripping the tube to hold it against retraction and a sealing mechanism for forming a seal between the tube and the connector body. The connector body may be formed from an opaque material and include a window therein. The window may be formed from a transparent material through which an end of the tube can be seen when the tube is correctly located within the connector.

13 Claims, 1 Drawing Sheet

CONNECTOR

CROSS REFERENCE TO RELATED APPLICATIONS

This application is a national stage filing under section 371 of International Application No. PCT/EP2012/051170, filed on Jan. 25, 2012, and published in English on Aug. 2, 2012, as WO 2012/101188, and claims priority to British Application No. 1101242.4 filed on Jan. 25, 2011. The entire disclosures of each of the prior applications are hereby incorporated herein by reference.

FIELD OF THE INVENTION

This invention relates to a connector for pipes and tubes.

BACKGROUND OF THE INVENTION

Connectors for tubes are known which have a hollow connector body and openings at one or both ends thereof for receiving an end of the tube(s). The connectors are typically provided with means for gripping the tube to prevent its retraction, and means for providing a seal (e.g. a fluid-tight seal such as a water-tight or gas-tight seal) between the tube and the connector body.

One common arrangement for holding the tube within the connector and providing a seal comprises a collet and an array of grab rings and sealing rings such as O-rings. The grab rings, which are typically formed of a metal material, have teeth which are inclined away from the end openings and which grip the surface of the tube. If an attempt is made to pull the tube out of the connector, the angle of inclination of the teeth means that they dig deeper into the wall of the tube and so prevent the tube from being retracted through the grab ring. The collet, which serves to hold the grab ring(s) and sealing ring(s) in place, is typically provided with a plurality of resilient arms which form a snap fit in lateral openings in the wall of the connector body and therefore cannot be retracted from the connector body without first depressing the resilient arms using a suitable tool.

Push fit connectors of the aforementioned type provide a generally very effective and secure means of connecting tubes together. However, they will only do so if the tubes are pushed in far enough to engage the gripping and sealing means correctly. If they are not pushed in far enough to make contact with and be gripped by the gripping means (e.g. the grab ring), then the joint formed between the connector and the tube may fail as soon as any axial tension is applied to the tube.

SUMMARY OF THE INVENTION

The present invention set out to provide a means of overcoming the problem described above and does so by providing a connector with a transparent window in an otherwise substantially opaque connector body, through which window can be seen the end of a tube when the tube is correctly located in the connector and is in engagement with the gripping and sealing means.

Accordingly in a first embodiment, the invention provides a connector for connecting to an end of a tube, the connector comprising a hollow connector body having an opening for receiving the end of the tube, the connector further comprising gripping means for gripping the tube to hold it against retraction and sealing means for forming a seal between the tube and the connector body, wherein the connector body is formed from an opaque material but has a window therein formed from a transparent material through which an end of the tube can be seen when the tube is correctly located within the connector.

The term "tube" as used herein is used in a broad sense to refer to tubes, pipes and formations of a tube or pipe-like nature.

In one embodiment, the term refers in a narrow sense to a tube per se.

The connector body may be configured to be connected to only a single tube or it may be configured to be connected to a plurality of tubes (e.g. two or three tubes).

When it is connected to only a single tube, it may be, or example, provided with means for attachment to an installation such as a bulkhead or an outlet from or inlet to a machine or reservoir. It may alternatively be used as an end cap for a tube.

More typically, the connector has openings at two or more ends thereof for connecting to the ends of two or more tubes.

For example, in one embodiment, the connector may be configured to connect together a pair of tubes.

In another embodiment, the connector may be configured to connect together three tubes, e.g. in a Y-connector.

In a preferred embodiment, the connector has openings at two ends thereof and a central passageway linking the openings, each of the two ends being provided with means for gripping a tube to hold it against retraction and means for forming a seal between a tube and the connector body.

The connector body is formed from a material (e.g. a plastics material) which is substantially opaque except where the window is formed.

The window may be defined by an insert formed from a transparent material (e.g. a transparent plastics material) which is held within a cavity or channel in the connector body. The insert may be formed separately and then inserted into the cavity in the connector body. Alternatively, the insert may be formed integrally with the connector body.

The insert may, for example, be held within a cavity in the form of a channel extending transversely across the connector body. The channel may be cylindrical in form, and the insert may take the form of a plug (e.g. a cylindrical plug) which is shaped to fit within the cavity (e.g. channel). Where the insert (e.g. plug) is formed separately from the connector body, it is preferably a tight (more preferably sealing) fit within the cavity. Alternatively, or additionally, one or more sealing members may be provided for forming a seal between the insert (e.g. plug) and the connector body.

The insert may have a passageway extending through it which is aligned with each opening for receiving a tube end.

In one embodiment, the connector body is configured to receive the ends of a pair of tubes and has a central passageway extending therethrough, and the window is disposed at or near a mid point of the connector so that the ends of the two tubes can be seen when the tubes are correctly located within the connector.

In this embodiment, the window may be defined by a plug of transparent material (e.g. transparent plastics material) which is held within a cavity in the connector body at or near the mid point thereof, and wherein the plug has a channel extending therethrough which forms part of the central passageway of the connector body.

The channel though the plug may be configured to provide a pair of axially facing abutment surfaces which in use serve as stops for the ends of the pair of tubes. The abutment surfaces may be provided by a radially inwardly oriented rib or flange formed on the wall of the channel.

The connector may be provided with one or more screw collars and a compression mechanism which is actuated by screwing the collars on to the connector body. More typically, however, the connector is a push fit connector.

The means for gripping the tube may comprise one or more grab rings.

The means for forming a seal between the tube and the connector body may comprise one or more sealing rings such as O-rings.

A collet may be provided for holding the sealing means and the gripping means inside the connector body.

DETAILED DESCRIPTION OF THE INVENTION

Figure 1:
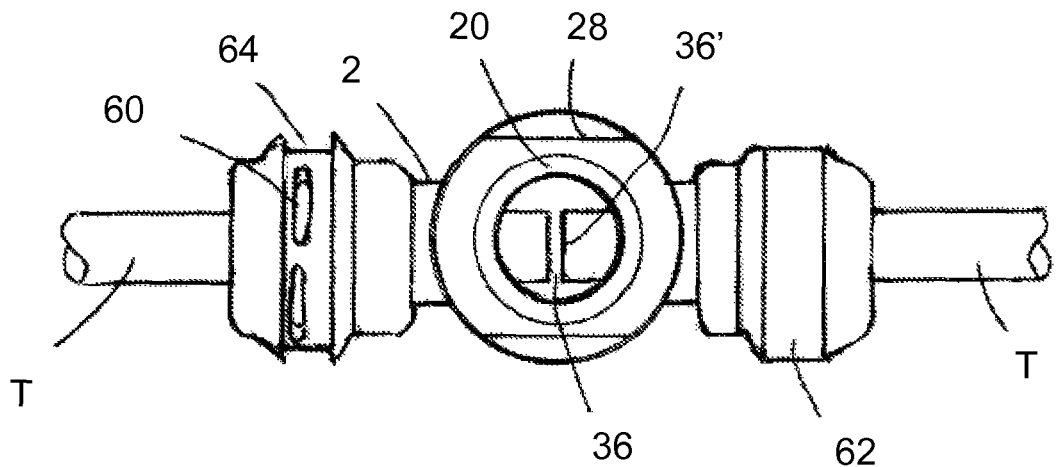
FIG. 1 is a side view of a connecter according to a first embodiment of the invention with a pair of tubes attached thereto. The interior profile is shown by means of dashed lines.
Figure 2:
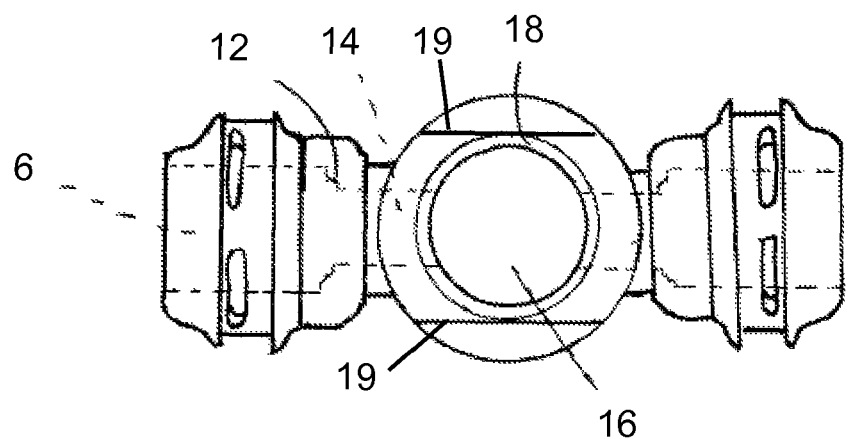
FIG. 2 is a side view of the connector body of the connector of FIG. 1 but with the tubes and the transparent window plug omitted.
Figure 3:
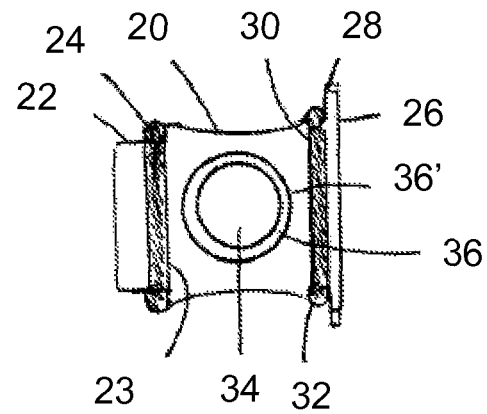
FIG. 3 is a side view of the transparent plug omitted from FIG. 2.

The invention will now be described in more detail, but not limited, by reference to the specific embodiments illustrated in the accompanying drawings FIGS. 1 to 3.

As shown in the drawings, the connector comprises a hollow connector body 2 formed of an opaque moulded plastics material and having openings at either end thereof. The interior of the connector body comprises a pair of wider bore regions 6 at the two ends (shown by means of the dotted line in FIG. 2, each of which leads via a pair of step surfaces and an inclined linking surface 12 to a restricted bore region 14. The two restricted bore regions 14 open out into a transversely extending cylindrical cavity 16 at the mid-point of the connector body. At one end of the cylindrical cavity 16 is a radially in-turned flange or lip 18.

A plug 20 of a transparent plastics material is located in the transverse cylindrical cavity 16. The plug 20, which is shown in cross section in FIG. 3, has a stepped end 22, upon which is mounted a sealing ring 24 formed from a suitable elastomeric sealing material. At the other end of the plug 20 is a radially outwardly oriented flange 26 which is generally circular in form but wherein two chord-shaped sections have been removed on opposed sides to give two flat edges 28. During assembly, the flat edges are aligned with the raised edges 19 on the connector body thereby ensuring that the plug 20 is in the correct orientation within the cavity. Inwardly of the flange 26, the surface of the plug 20 has a circumferential channel 30 in which is seated a second sealing ring 32.

The stepped end 22 of the plug is of a size such that it fits through the opening defined by the in-turned flange or lip 18 and the leading edge of the stepped end is substantially flush with the outer surface of the connector body. The sealing ring 24 is held and compressed between the step 23, the inner wall of the cylindrical cavity 16 and the in-turned flange or lip 18 so as to form a substantially fluid tight seal. The sealing ring 32 is compressed between the plug 20 and the inner wall of the cylindrical cavity 16 so that it provides a fluid tight seal at the other end of the plug 20.

The plug 20 has a transverse passageway 34 which is aligned with the longitudinal axis of the connector body and communicates with the restricted bore regions 14 of the connector body. The transverse passageway 34 has a centrally located radially inwardly oriented rib or flange 36, the two sides 36' of which act as end stops for any pipes or tubes inserted into the connector.

The two wider bore regions 6 together with the restricted bore regions 14 and the transverse passageway 34 through the plug together form a central passageway extending from one end of the connector to the other.

Each of the two wider bore regions 6 contains an assembly (not shown) for gripping and sealing against an end of a pipe or tube inserted into the connector.

Each assembly comprises, in sequence in a direction towards the opening at the end of the connector body, an inner grab ring, an inner spacer ring, an outer grab ring, an outer spacer ring, a sealing O-ring and a collet.

The inner grab ring which is seated against the inclined surface 12, is formed from a metal material and has an array of radially inwardly oriented teeth which are slightly inclined towards the mid-point of the connector. The inner spacer ring, which is formed from a plastics material, has an inclined inner surface which forms a seat which accommodates outer grab ring. The outer spacer ring, sits between the outer grab ring and an O-ring sealing ring formed from a suitable elastomeric sealing material.

The gripping and sealing assembly is completed by the collet which holds the grab rings, spacers and O-ring in place.

The collet, which is substantially cylindrical in shape, is formed from plastics material and has four resilient arms, each of which has an enlarged end with an inclined leading surface and a trailing surface which is substantially perpendicular to the axis of the connector. The terms "leading" and "trailing" in the present context refer to the orientation of the surfaces as the collect is pushed into the connector body during assembly. Thus, during assembly of the connector, the enlarged ends of the resilient arms form a snap fit into lateral openings 60 in the wall of the connector body. Once the enlarged ends of the resilient arms have snapped into place, the trailing surfaces on the enlarged ends prevent retraction of the collect from the connector body.

The lateral openings 60 in the wall of the connector body 2 are concealed by means of C-shaped spring clips 62 which are held in correspondingly shaped near circumferential recesses 64 running around the exterior of the connector body.

Prior to use, the two ends of the connector are closed by means of end caps (not shown) which prevent dirt and other contaminants entering the interior of the connector.

In use, the end caps are removed and tubes T are inserted into the two ends of the connector. The tubes T form a tight friction fit within the collets. The tubes T are inserted so that the ends of the tubes pass through the grab ring and sealing ring assemblies and into the transverse passageway 34 through the plug where they abut against the two sides 36' of the radially inwardly oriented rib or flange 36. The plug 20, which is formed of a transparent plastics material, acts as a window through which it can be seen whether or not the ends of the tube have been pushed into the connector far enough to engage the gripping and sealing assembly.

Thus, the connector of the invention provides a solution to the problem of establishing whether or not tubes have been pushed sufficiently far enough into a connector to form a secure sealed connection.

The invention has been illustrated by reference to a connector which can be connected at both ends to a tube. However, it will be appreciated that the connector may be configured to enable connection to only one tube or to more than two tubes. For example, the connector could be a y-shaped three way connector.

It will readily be apparent that numerous modifications and alterations may be made to the specific embodiments of the invention described above without departing from the principles underlying the invention. All such modifications and alterations are intended to be embraced by this application.

The invention claimed is:

1. A connector for connecting to an end of a tube, the connector comprising a hollow connector body having an opening for receiving the end of the tube, the connector further comprising gripping means for gripping the tube to hold said tube against refraction and sealing means for forming a seal between the tube and the connector body, wherein the connector body is formed from an opaque material but has a window therein formed from a transparent material through which an end of the tube can be seen when the tube is correctly located within the connector, wherein said window is defined by an insert formed from a transparent material which is held within a channel in the connector body, and the insert has a passageway extending therethrough which is aligned with the opening for receiving the tube end.

2. A connector according to claim 1 having a secondary opening for receiving the end of a second tube, the opening and the secondary opening being at ends of the connector.

3. A connector according to claim 2 wherein the passageway of the insert is further aligned with the secondary opening for receiving the end of the second tube.

4. A connector according to claim 1 wherein the insert is held within a channel extending transversely across the connector body.

5. A connector according to claim 1 wherein the insert has one or more sealing elements for providing a seal between the insert and the connector body.

6. A connector according to claim 1 wherein the connector body is configured to receive the ends of a pair of tubes and has a central passageway extending therethrough, and wherein the window is disposed at or near a mid point of the connector so that the ends of the two tubes can be seen when the tubes are correctly located within the connector.

7. A connector according to claim 6 wherein the window is defined by a plug of transparent material which is held within a cavity in the connector body at or near the mid point thereof, and wherein the plug has a channel extending therethrough which forms part of the central passageway of the connector body.

8. A connector according to claim 7 wherein the channel is configured to provide a pair of axially facing abutment surfaces which in use serve as stops for the ends of the pair of tubes.

9. A connector according to claim 7 wherein the cavity is in the form of a channel extending transversely across the connector body.

10. A connector according to claim 1 which is a push fit connector.

11. A connector according to claim 10 wherein the means for gripping the tube comprises one or more grab rings.

12. A connector according to claim 10 wherein a collet is provided for holding the sealing means and the gripping means inside the connector body.

13. A connector according to claim 1 wherein the means for forming a seal between the tube and the connector body comprises one or more sealing rings such as O-rings.

\* \* \* \* \*